(12) United States Patent
Shaheen (10) Patent No.: US 10,583,495 B1
(45) Date of Patent: Mar. 10, 2020

(54) SWISS TURNING INSERT, SWISS TOOL HOLDER AND ASSEMBLY

(71) Applicant: Iscar, Ltd., Tefen (IL)

(72) Inventor: Philip Shaheen, Tarshiha (IL)

(73) Assignee: Iscar, Ltd., Tefen (IL)

( * ) Notice: Subject to any disclaimer, the term of this patent is extended or adjusted under 35 U.S.C. 154(b) by 0 days.

(21) Appl. No.: 16/132,876

(22) Filed: Sep. 17, 2018

(51) Int. Cl.
    *B23B 27/16*     (2006.01)

(52) U.S. Cl.
    CPC .. *B23B 27/1681* (2013.01); *B23B 2200/0485* (2013.01); *B23B 2200/328* (2013.01); *B23B 2205/04* (2013.01); *B23B 2205/12* (2013.01)

(58) Field of Classification Search
CPC ............ B23B 27/1666; B23B 27/1625; B23B 27/1633; B23B 27/1674; B23B 27/1681; B23B 27/1685; B23B 2205/04; B23B 2205/045; B23B 2205/12; B23B 2200/0485; B23B 2200/328
See application file for complete search history.

(56) References Cited

U.S. PATENT DOCUMENTS

| 1,239,459 | A | | 9/1917 | Carew | |
|---|---|---|---|---|---|
| 2,500,387 | A | | 3/1950 | Sheridan | |
| 3,156,032 | A | * | 11/1964 | Lundgren | B23B 27/1625 407/114 |
| 3,546,759 | A | * | 12/1970 | Sirola | B23B 27/007 407/73 |
| 9,901,986 | B2 | | 2/2018 | Makhlin et al. | |
| 2012/0213600 | A1 | | 8/2012 | Hecht | |
| 2019/0160548 | A1 | | 5/2019 | Larsson et al. | |

FOREIGN PATENT DOCUMENTS

| DE | 2555035 A1 | * | 6/1977 | ............ B23B 27/16 |
|---|---|---|---|---|
| DE | 10225809 A1 | * | 3/2003 | ......... B23B 27/1681 |
| DE | 102017212200 A1 | * | 1/2019 | ........... B23C 5/2406 |
| FR | 2228566 | | 12/1974 | |
| GB | 350706 A | * | 6/1931 | ............ B23B 27/08 |
| WO | WO-2008149371 A1 | * | 12/2008 | ............ B23B 27/12 |

OTHER PUBLICATIONS

International Search Report dated Nov. 25, 2019, issued in PCT counterpart application (No. PCT/IL2019/051019).
Written Opinion dated Nov. 25, 2019, issued in PCT counterpart application (No. PCT/IL2019/051019).

\* cited by examiner

*Primary Examiner* — Alan Snyder
(74) *Attorney, Agent, or Firm* — Womble Bond Dickinson (US) LLP (57) ABSTRACT

A swiss turning tool assembly includes an insert and a tool holder. The tool holder includes a head portion which in turn includes an insert pocket and a fastener hole opening out to a flank side of the tool and to a pocket opening in the insert pocket. The insert pocket also includes a tool clamping arrangement which in turn includes a tool base surface and at least one tool abutment surface forming an external acute angle with the tool base surface. The insert includes an insert base surface which in turn includes at least one insert abutment surface forming an internal acute angle with the insert base surface. To achieve a clamped position, a single fastener, accessed from the tool's flank side abuts the insert.

20 Claims, 8 Drawing Sheets

SWISS TURNING INSERT, SWISS TOOL HOLDER AND ASSEMBLY

FIELD OF THE INVENTION

The subject matter of the present application relates to so-called Swiss turning inserts, Swiss tool holders and Swiss turning tool assemblies comprising same.

BACKGROUND OF THE INVENTION

So-called Swiss turning tool assemblies and their components, are special purpose tools designed for use in swiss-style CNC machines (lathes) which are typically used for high precision machining applications. An example Swiss turning tool assembly of the field to which the present application is directed (Swiss turning assemblies for turning applications) is further detailed in U.S. Pat. No. 9,901,986, assigned to the present applicant and incorporated herein by reference for understanding the unique requirements of Swiss tool assemblies.

Swiss tool assemblies achieve high precision is achieved by the workpiece being held close to a bushing to minimize overhang and maximize stability and structural strength. Hereinafter the names "Swiss" or "Swiss turning" are sometimes omitted for conciseness only, but it should be understood that the subject matter of this application is specifically directed to only to turning inserts, tool holders and assemblies designed for specific Swiss-style machining.

Figures 1A, 1B:
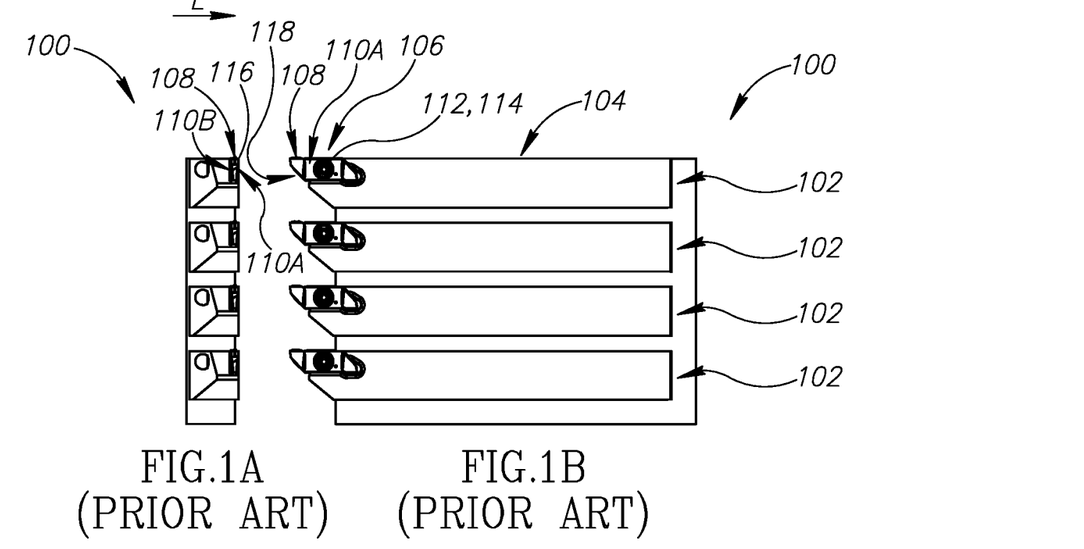
FIG. 1A is a front view of a prior art gang comprising four swiss-style tool assemblies.
FIG. 1B is a side view of the gang in FIG. 1A.

The design of Swiss inserts is limited by the requirement to machine very close to the bushing and other tool assemblies in a gang 100 (see, e.g., FIGS. 1A and 1B of the present application, the drawings of which, but not the numbers, correspond to figures in U.S. Pat. No. 9,901,986).

As shown in FIGS. 1A and 1B, there are four tool assemblies 102 shown. Each tool assembly 102 comprises a tool holder 104 and a turning insert 106. It is noted that turning inserts 106 are subjected to higher lateral forces than parting-off or grooving inserts, due to their also being used in turning operations (i.e. lateral machining in the direction designated $D_L$). It is however noted, that turning inserts may also be configured with a grooving capability. As noted above, the name "turning" may be omitted for conciseness only, when referring to inserts hereinafter.

The turning inserts 106 have a rake surface 108, above which chips flow (not shown), and flank surfaces 110A, 110B. A screw hole 112 and 114 extend through the flank surfaces 110 to clamp each insert 106 to a respective tool holder 104. A cutting edge 116 is formed at an intersection of at least the externally located the flank surface 110A and the rake surface 108.

Due to the inserts 106 being in close proximity to each other in the gang 100, and directly above one another due to the nature of Swiss-style CNC machining, the inserts do not have a clamping hole, such as a screw hole, extending through the rake surfaces 108 thereof but rather the screw holes 112 extend through the flank surfaces 110 thereof for accessibility purposes. It will be understood that such clamping arrangement (screw hole 112 extending through the insert's flank surfaces 110) avoids the difficulty caused by the closely packed tool assemblies and is a popular manner to secure a Swiss cutting insert.

Nonetheless, it will be noted that the cutting portion 118, to use an improvised name for the front portion of the insert shown by the arrow designated 118, is unsupported by the tool holder 104.

Figure 2A:
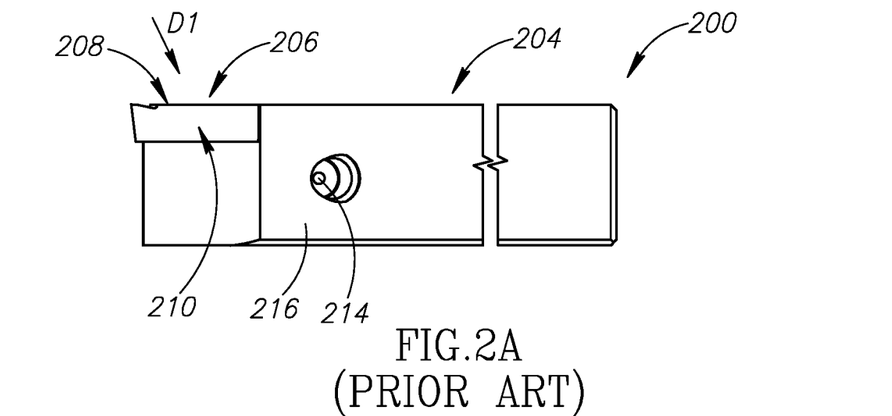
FIG. 2A is a side view of a different prior art swiss-style tool assembly.
Figure 2B:
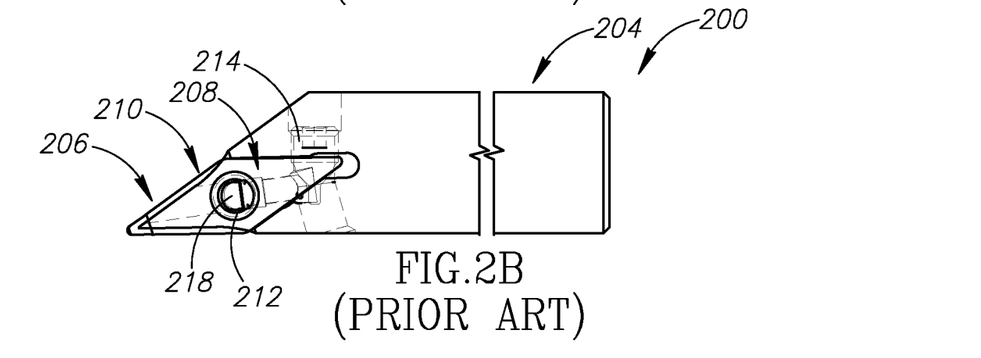
FIG. 2B is a top view of the tool assembly in FIG. 2A.

In the further prior art example shown in FIGS. 2A and 2B, a prior art Swiss tool assembly 200 of the Applicant is shown.

Tool assembly 200 comprises a tool holder 204 and a turning insert 206. The turning insert 206 has a rake surface 208, above which chips flow (not shown), and flank surfaces 210.

Contrary to the previous example, the clamping arrangement includes a clamping hole 212 extending through the rake surface 208, and clamping is achieved through rotation of a screw 214, accessible through a flank surface 216 of the tool holder 204, and not the insert's flank surfaces 210. The screw 214 causes a lever 218 that extends through the clamping hole 212 to move in a backwards and downwards direction D1 to clamp the insert 206 to the tool holder 204.

In contradistinction to the previous example, the insert 206 of tool assembly 200 is more supported by the tool holder 204 than the previously described insert 106, nonetheless the clamping arrangement thereof is considerably more complex and expensive.

It is an object of the present application to provide an improved swiss turning insert, tool holder and tool assembly, particularly with high structural stability yet a simpler and more user friendly clamping arrangement.

SUMMARY OF THE INVENTION

In accordance with a first aspect of the subject matter of the present application, there is provided a Swiss turning tool assembly comprising: an insert; and a tool holder; the insert comprising: opposite rake and insert base surfaces and an insert flank surface connecting the rake and insert base surfaces; a cutting edge formed along at least a portion of an intersection of the insert flank surface and the rake surface; and an insert clamping arrangement in turn comprising a first insert abutment surface forming an internal acute angle with the insert base surface; the tool holder comprising: opposite front and rear tool ends; opposite upper and lower tool sides connecting the front and rear tool ends; opposite first and second flank tool sides connecting the front and rear tool ends and the upper and lower tool sides; an elongated shank portion defining a tool elongation axis; and a head portion connected to the shank portion; the head portion comprising: an insert pocket; a fastener hole having a fastener hole axis and extending through at least one of the first and second flank tool sides, the fastener hole opening out to a pocket opening in the insert pocket; and a single fastener configured to bring the insert into a clamped position on the insert pocket; the insert pocket comprising a tool clamping arrangement which in turn comprises: a tool base surface; and a first tool abutment surface forming an external acute angle with the tool base surface; wherein: the fastener is configured to occupy the fastener hole and protrude into the insert pocket via said pocket opening and abut the insert to bring the tool and insert clamping arrangements into a clamped position; and wherein, in the clamped position: the fastener abuts the insert; the first tool abutment surface abuts the first insert abutment surface; and the tool base surface abuts the insert base surface.

It will be appreciated that the essence of the invention is that a clamping is achieved via operation of a fastener accessed by the flank tool side and that the provision of said first tool abutment surface and second insert abutment surface provide a downward clamping force such that only a single fastener can be used.

To elaborate regarding the advantage of clamping the insert via the flank tool side, accessing the fastener via the flank tool side allows indexing and clamping of the insert without the tool holder needing to be removed from a gang (notably problematic for Swiss machining). It also allows the tool holder to have a high structural stability (i.e. the tool holder located underneath and along the side of the insert, more than the example in FIG. 1A), to more fully support the insert (also of high importance to Swiss machining). Additionally, the fastener not extending through a clamping through hole in the insert means that the screw does not have to be completely removed to index or replace the insert, i.e. a so-called as a 'no falling parts' design. Stated differently, the tool assembly comprises a fastener hole extends through both of first and second flank tool sides; a fastener is rotatable about a fastener axis within a fastener hole; and in a clamped position, a fastener axis neither intersects, nor passes through, the insert.

Further the single fastener is a significant improvement in design over the previously known arrangement in FIGS. 2A and 2B.

To summarize the advantage of the present invention over prior art: a less complex tool clamping arrangement, i.e. operation of a single fastening component, is provided over the example shown in FIGS. 2A and 2B which requires more than one fastener component; however, even though the production of the first insert and tool abutment surfaces is more complex and expensive than the simple insert and standard screw shown in FIGS. 1A and 1B, which also allows insert removal without tool holder removal from a gang, a more structurally supportive tool holder structure for the insert is theoretically achieved. Thus a comparatively large cutting depth can be achieved.

In accordance with a second aspect of the subject matter of the present application, there is provided a Swiss tool holder comprising: opposite front and rear tool ends; opposite upper and lower tool sides connecting the front and rear tool ends; opposite first and second flank tool sides connecting the front and rear tool ends and the upper and lower tool sides; an elongated shank portion defining a tool elongation axis; and a head portion connected to the shank portion; the head portion comprising: an insert pocket; a fastener hole extending through at least one of the first and second flank tool sides and opening out to a pocket opening in the insert pocket; and a single fastener.

In accordance with a third aspect of the subject matter of the present application, there is provided a Swiss turning insert comprising: opposite rake and insert base surfaces and an insert flank surface connecting the rake and insert base surfaces; and an insert clamping arrangement comprising a first insert abutment surface forming an internal acute angle with the insert base surface.

It will be understood that in the specification and claims, the directions given are only for reference to other elements of the same or other components and is not relative to the ground. Similarly, when stating, for example, that the tool holder has upper, lower, first and second flank sides, this should not be construed to infer a square shape. Even, for example, a cylindrical shank can be theoretically divided into such sides. It will be understood that the purpose of such definitions is again to understand how the insert is clamped and functions when machining, i.e. relative directions to understand force applications. In cases where a particular shape or geometry is important it will be defined in geometric terms.

Preferably, the fastener is configured to abut the insert such that the insert is at least partially rotated into the clamping position. Alternatively or additionally, preferably the insert pocket comprises opposite front and rear pocket ends, the front pocket end being closer to the front tool end than the rear pocket end; and in the clamping position there is abutment of the fastener and the insert at the rear pocket end. More precisely, preferably, the pocket opening opens out to the rear pocket end. In some preferred embodiments with stopper insert and tool abutment surfaces (described below) the fastener can be alternatively or additionally configured to also abut the insert such that it is moved towards the front tool end. Most preferably, the fastener can abut the insert to rotate the insert and move it towards the front tool end.

Advantageously, a threaded shank portion of the fastener can comprise a relief portion adjacent to an abutment end of the fastener. This assists to ensure the insert does not scrape the threaded portion. Stated differently, the fastener's threaded shank portion can comprise, adjacent to the screw head portion, a relief portion having a diameter smaller than the threaded part of the threaded portion.

In accordance with a fourth aspect of the subject matter of the present application, there is provided a fastener for a Swiss turning tool assembly comprising: a screw head portion and a threaded shank portion connected thereto; the screw head portion comprising: a tool receiving end formed with a tool receiving arrangement; an insert abutment end comprising a chamfered corner; a head axial length $L_H$ defined from the tool receiving end to the insert abutment end; a shank axial length $L_S$ defined along a threaded portion of the threaded shank portion; wherein the head axial length $L_H$ is equal to or greater than half of the shank axial length $L_S$.

It will be understood that such fastener, designed for abutment in an unusual manner, is advantageous due to the unusually long head portion thereof, for stability.

Preferably, the screw head portion is formed with an annular recessed portion, which assists in further defining abutment regions of the fastener to the fastener hole in which it is located.

The following preferences are applicable to each of the aspects:

The insert can comprise opposite front and rear insert sides, and opposite first and second flank insert sides. Preferably the fastener can abut the insert at only the rear insert side, or only an intersection region of the rear insert side and the first flank insert side. If only the rear insert side is abutted (i.e. at a rear pocket end) this can push the insert forward into the clamped position. If the intersection region is abutted, this can push the insert forward as well as rotate the insert into the clamped position which is currently the most preferred configuration. Notably, abutment at the rear end of the insert allows advantageous compactness of the tool holder and consequently tool assembly.

The tool clamping arrangement can further comprise a second tool abutment surface further from the front tool end than the first tool abutment surface, and the first and second tool abutment surfaces are each closer to a different one of the first and second flank tool sides. The insert clamping arrangement can further comprise a second insert abutment surface spaced apart from the first insert abutment surface. In the clamped position, the first and second tool abutment surfaces respectively abut the first and second insert abutment surfaces. Similarly, when the tool clamping arrangement further comprises a third tool abutment surface and the insert clamping arrangement comprises a third insert abutment surface, they can abut each other in the clamping position.

Preferably, the insert pocket opens out to the upper tool side and the first flank tool side and the first tool abutment surface is closer to the first flank tool side than the second flank tool side. It will be understood that the insert can be primarily configured to work in a direction basically from the first flank tool side towards the second flank tool side, and hence support at the first flank tool side extra strength is advantageous. Further, in such case it is preferable that a second tool abutment surface, which is further from the front tool end than the first tool abutment surface, is closer to the second flank tool side than the first flank tool side.

The first tool abutment surface can be parallel or basically parallel to the elongation axis. Stated differently. in a top view of the tool base surface, the first tool abutment surface is substantially parallel with the tool elongation axis within 15° (i.e. ±15°) preferably within 5° (i.e. ±5°).

Preferably, the tool clamping arrangement further comprises a second tool abutment surface forming an external acute angle with the tool base surface. This can provide further stability to the insert (restraining upward motion at two ends of the insert) and/or can allow the insert to be indexable.

The second tool abutment surface can be parallel or basically parallel to the elongation axis. Stated differently. in a top view of the tool base surface, the second tool abutment surface is substantially parallel with the tool elongation axis within 15° (i.e. ±15°) preferably within 5° (i.e. ±5°).

Preferably the insert pocket has a basic elongate shape which is basically parallel with the tool elongation axis. It will be understood that an elongated shape is particularly suited to the space constricted environment in which a Swiss turning tool assembly operates.

Preferably, the head portion comprises a pocket wall extends higher than the first tool abutment surface. Preferably the pocket wall is adjacent to the first tool abutment surface. Stated differently, preferably both the pocket wall and first tool abutment surface are closer to the first flank tool side than the second flank tool side. Preferably, the pocket wall extends axially forward of an opposing wall adjacent the first flank tool side. The opposing wall can only be located adjacent the rear pocket end such that the insert pocket is open to the second flank tool side.

Preferably, the tool clamping arrangement can comprise a stopper tool abutment surface (also called hereinafter a third tool abutment surface, since in the shown example the tool clamping arrangement already comprises two other tool abutment surfaces). Preferably the third tool abutment surface can be located (e.g. axially located parallel with the elongation axis) between the first and second tool abutment surfaces. Preferably the third tool abutment surface can form an external acute angle with the tool base surface. The third tool abutment surface can be configured to restrict movement of the insert parallel to the elongation axis.

In a top view of the tool base surface, the first and third tool abutment surfaces can form a third tool abutment surface angle $\beta3$ fulfilling the condition: $45°<\beta2<135°$, more preferably $75°<\beta3<115°$, and most preferably $85°<\beta3<95°$.

Additionally, or alternatively, the third tool abutment surface can be defined with respect to the elongation axis, i.e. it can be transverse, preferably basically perpendicular or perpendicular thereto. This transverse orientation, preferably perpendicular, is for restricting movement of the insert in a direction parallel with the elongation axis.

In embodiments where the insert is elongated and has an insert elongation axis, in a bottom view of the insert base surface, the first insert abutment surface is substantially parallel with the insert elongation axis (±15°) preferably within 5° i.e. (±5°).

Preferably, the insert further comprises a second insert abutment surface forming an internal acute angle with the insert base surface. This can provide further stability to the insert (restraining upward motion at two ends of the insert) and/or can allow the insert to be indexable.

In embodiments where the insert is elongated and has an insert elongation axis, in a bottom view of the insert base surface, the second insert abutment surface is substantially parallel with the insert elongation axis (±15°) preferably within 5° i.e. (±5°).

Accordingly, preferably, the insert can be a two-way indexable insert further comprising a second insert abutment surface forming an internal acute angle with the insert base surface, the insert, at least with respect to the insert abutment surfaces, can be 180° rotationally symmetric.

One possibility for the first and second insert abutment surfaces to allow the insert to be rotationally symmetric (whether 180 degrees or some other angle, e.g. if the insert is three-way indexable, or four-way indexable etc.) is that the first and second insert abutment surfaces can face the same rotational direction. While a two-way indexable insert is currently the most preferred option as it allows an elongated shaped insert for a constricted area, higher indexability could provide a separate advantage of additional indexing options which increases the value of an insert.

Preferably the cutting edge of the insert can be 180° rotationally symmetric, however it is also conceivable that each indexable end of the insert could have a different function.

Preferably the frontmost portion of the cutting edge is a wiper. Stated differently, angled at a right-angle from the adjacent portion of the cutting edge which extends along a flank insert side.

Preferably the insert has a basic elongate shape. It will be understood that an elongated shape is particularly suited to the space constricted environment in which a Swiss turning tool assembly operates. Further the slanted insert abutment surfaces allow the insert to be clamped with the advantages stated above which are not currently known to be available for Swiss turning tools.

Preferably the insert can have a solid insert shape (stated differently, the insert can be devoid of a clamping through hole). This can allow a stronger insert for a given size. Another advantage is that a smooth rake surface can allow unimpeded chip flow.

Preferably, the insert can comprise a stopper insert abutment surface (also called hereinafter a third insert abutment surface, since in the shown example where the insert already comprises two other insert abutment surfaces). Most preferably, a single recess can comprise both the third insert abutment surface and an insert base surface which extends adjacent thereto. Preferably the third insert abutment surface can form an internal acute angle with the insert base surface.

In a bottom view of the insert, the first and third insert abutment surfaces can form an external insert abutment surface angle $\lambda$ fulfilling the condition: $45°<\lambda<135°$, more preferably $75°<\lambda<115°$, and most preferably $85°<\lambda<95°$.

It will be understood that in the clamped position, the only contact areas of the insert and tool holder are the fastener and the insert, the tool and insert base surfaces and the tool and insert abutment surfaces (regardless of there being one, two or three etc.). Thus the contact areas are as described above in the first aspect. In embodiments where the insert clamping arrangement further comprises a second insert abutment surface and the tool clamping arrangement further comprises a second tool abutment surface, in the clamped position there is also abutment of the second tool abutment surface and the second insert abutment surface. Similarly, in embodiments where the insert clamping arrangement further comprises a third insert abutment surface and the tool clamping arrangement further comprises a third tool abutment surface, in the clamped position there is also abutment of the third tool abutment surface and the third insert abutment surface.

Preferably the insert can be an ISO D-type insert (having a 55° angle) or smaller (e.g. a V-type insert having a 35° angle).

It will be understood that although opposite first and second flank tool sides connected to opposite upper and lower tool sides are defined, this does not require the tool holder or the shank thereof to have a quadrilateral shape but rather this definition provides a relative location. For example a tool's shank could be cylindrical, with the outer surface of each 90 degree quadrant constituting one of the tool sides.

The fastener can be a screw comprising a screw head portion and a threaded shank portion connected thereto. The fastener hole can be formed with threading which corresponds to the threaded shank portion.

A screw head portion can comprise opposite tool receiving and insert abutment ends.

A screw head portion can comprise a head axial length defined from the tool receiving end to the insert abutment end.

A threaded shank portion can comprise a shank axial length defined along a threaded portion thereof.

Preferably, the head axial length is equal to or greater than half of the shank axial length.

Preferably, the screw head portion further is formed with an annular recessed portion located between the tool receiving end and insert abutment end.

BRIEF DESCRIPTION OF THE DRAWINGS

For a better understanding of the subject matter of the present application, and to show how the same may be carried out in practice, reference will now be made to the accompanying drawings, in which.

DETAILED DESCRIPTION

Figure 3A:
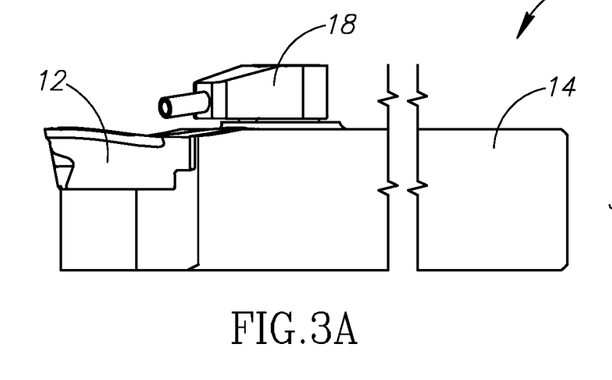
FIG. 3A is a side view of an example swiss-style tool assembly according to the subject matter of the present application.
Figure 3B:
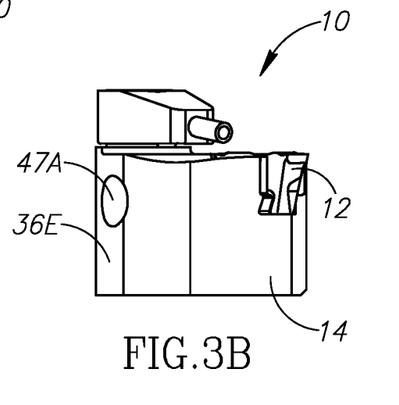
FIG. 3B is a front view of the tool assembly in FIG. 3A.
Figure 3C:
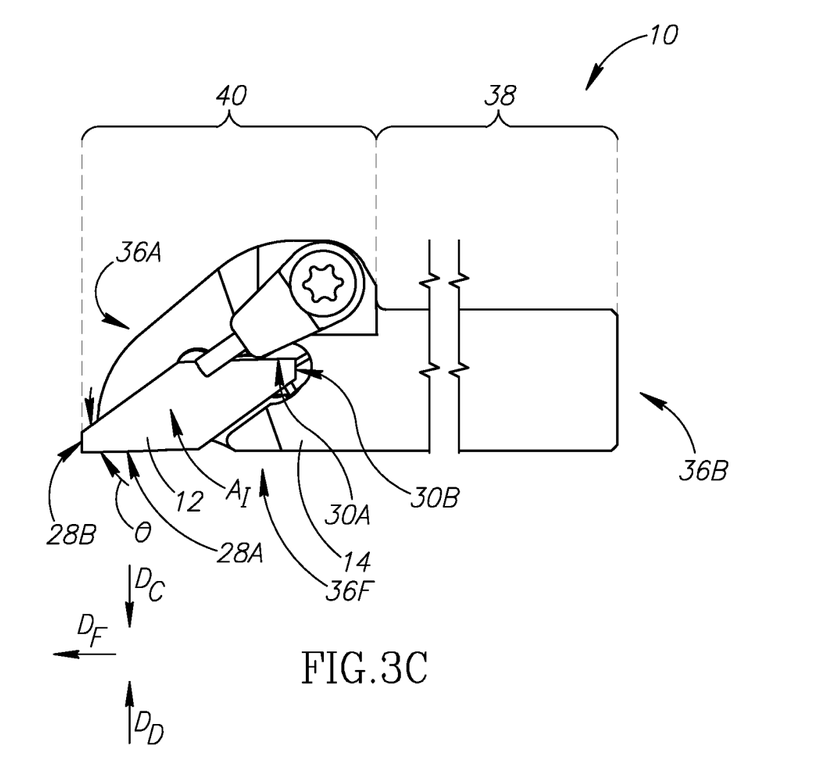
FIG. 3C is a top view of the tool assembly in FIG. 3A.

Referring to FIGS. 3A to 3C, illustrated is a tool assembly 10 comprising an insert 12, a tool holder 14 and a fastener 16 (shown in FIGS. 4A-4C) for securing the insert 12 to the tool holder 14.

The tool assembly 10 can optionally comprise a coolant arrangement 18.

Notably, for the essential function of machining, only three components are needed for the tool assembly 10, namely the insert 12, tool holder 14 and a single fastener 16. In the embodiment shown, the fastener 16 has unitary one-piece construction. Moreover, as discussed further below, the fastener abuts (i.e., directly contacts) the insert 12, without an intervening element.

Figure 4A:
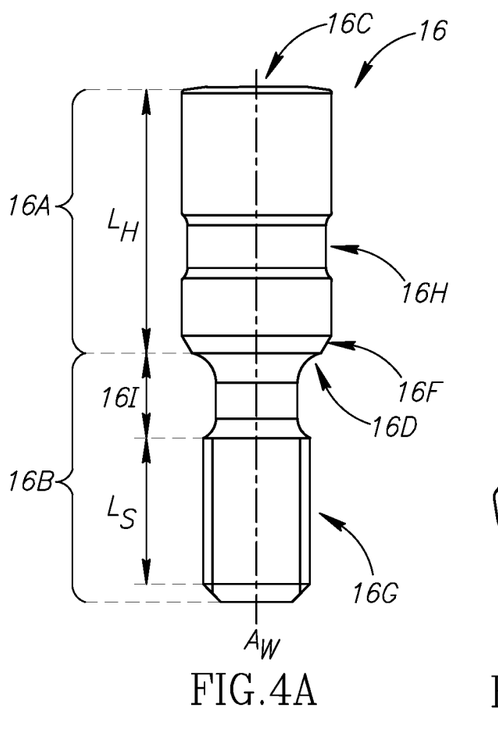
FIG. 4A is a side view of a screw of the tool assembly in FIG. 3A.
Figure 4B:
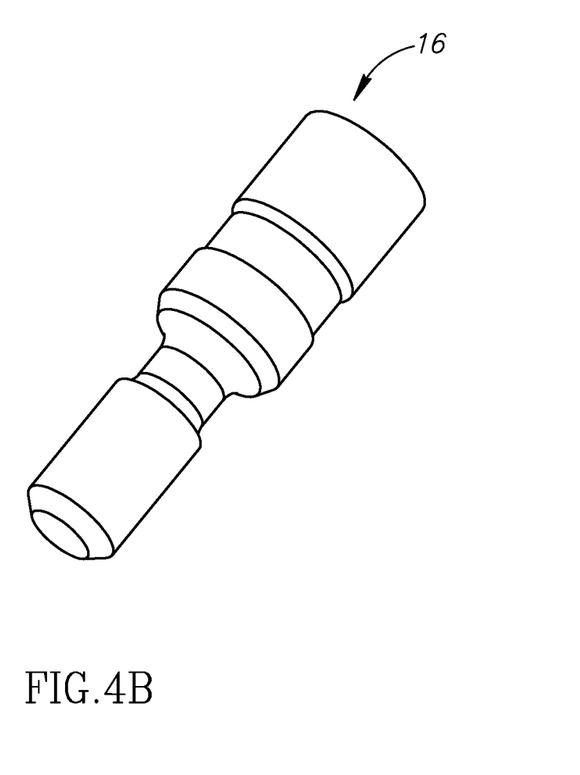
FIG. 4B is a perspective view of the screw in FIG. 4A.
Figure 4C:
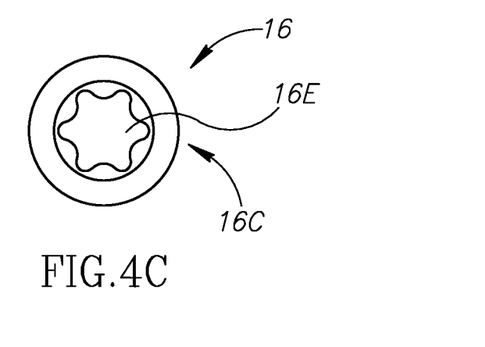
FIG. 4C is a rear view of the screw in FIG. 4A.

Referring to FIGS. 4A to 4C, the fastener 16 has a fastener axis $A_W$ around which the fastener is rotatable. The fastener is preferably a screw comprising a screw head portion 16A and a threaded shank portion 16B connected thereto.

The screw head portion 16A can comprise opposite tool receiving and insert abutment ends 16C, 16D. More precisely, the tool receiving end 16C is formed with a tool receiving arrangement 16E (in this example a Torx® keyway).

Similarly, the insert abutment end 16D can comprise a chamfered corner 16F designed to abut the insert 12 (FIG. 3A).

The screw head portion 16A can comprise a head axial length $L_H$ defined from the tool receiving end 16C to the insert abutment end 16D.

The threaded shank portion 16B can comprise a threaded portion 16G, and a shank axial length $L_S$ is defined along the threaded portion 16G.

Preferably, the head axial length $L_H$ is equal to or greater than half of the shank axial length $L_S$ for abutment purposes as will be explained below.

Additionally, preferably, the screw head portion 16A is formed with an annular recessed portion 16H.

Advantageously, the threaded shank portion 16B comprises a relief portion 16I (i.e., having an outer diameter which is smaller than the diameter of the threading) which ensures that the fastener 16 can abut the insert 12 at only the intended insert abutment end 16D thereof (i.e., ensuring the insert 12 does not scrape the threaded portion 16B).

Referring to FIGS. 3C and 5A to 5D, the insert 12 preferably has a basic elongate shape with, for example, an ISO D-type shape (having a 55° angle represented as θ).

Figure 5A:
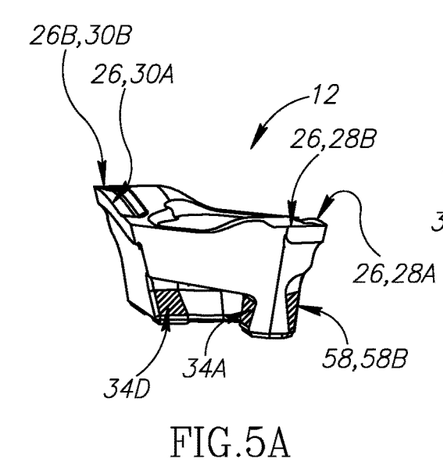
FIG. 5A is a front perspective view of an insert of the tool assembly in FIG. 3A, with intended abutment surfaces exemplified with imaginary hatch lines.
Figure 5B:
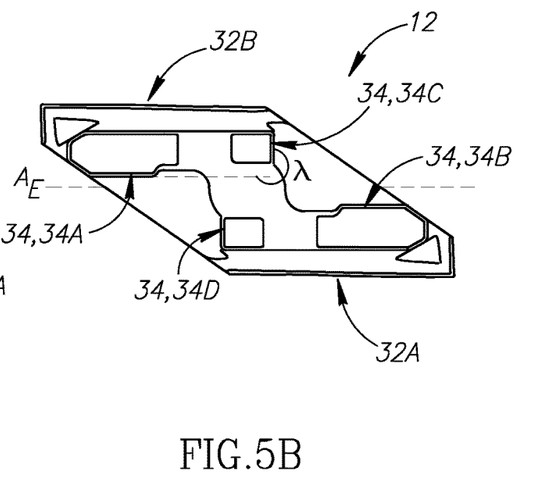
FIG. 5B is a bottom view of the insert in FIG. 5A.
Figure 5C:
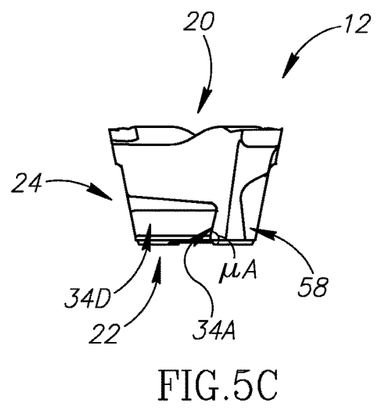
FIG. 5C is a front view of the insert in FIG. 5A.
Figure 5D:
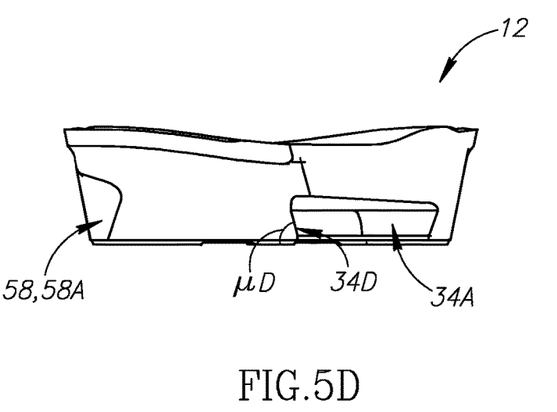
FIG. 5D is a side view of the insert as shown in FIG. 5A.

A central insert axis $A_I$ is shown in FIG. 3C, and an insert elongation axis $A_E$ is shown in FIG. 5B.

In this example, the insert 12 is a two-way indexable insert when rotated exactly (and only 180° about the central insert axis $A_I$.

The insert 12 comprises opposite rake and insert base surfaces 20, 22 and an insert flank surface 24 connecting the rake and insert base surfaces 20, 22. The rake and base surfaces 20, 22 differ from one another in structure and function, and so the insert 12 is single-sided.

A cutting edge 26 is formed along at least a portion of an intersection of the insert flank surface 24 and the rake surface 20. In this example, as the insert 12 is two-way indexable, the cutting edge has two identical portions 28, 30. Specifically, in the preferred example each portion has a main (larger) cutting edge 28A, 30A for turning, and each portion has a frontmost portion forming an auxiliary cutting edge 28B, 30B (which preferably but optionally is configured as a wiper). Nonetheless, each auxiliary cutting edge 28B, 30B can be provided a limited plunging capability.

Notably, the insert elongation axis $A_E$, in embodiments where the insert is elongated, for the purposes of the specification and claims, is not defined with respect to a cutting edge which can be of various shapes but rather is defined as parallel to, and extending midway between, the two longest sides 32A, 32B (FIG. 5B) of the insert 12.

The insert 12 further comprises an insert clamping arrangement 34 which in this example, comprises first, second, third and fourth insert abutment surfaces 34A, 34B, 34C, 34D. It will be understood that to be functional, only the first insert abutment surface 34A (which, as will be described below, in the clamped position will be the closest insert abutment surface to a front tool end 36A, FIG. 6C) would be sufficient. The second insert abutment surface 34B (which, as will be described below, in the clamped position will be the furthest insert abutment surface from the front tool end 36A) is beneficial for stability of the insert 12, and in this present example in which the insert 12 is indexable, additionally after indexing replaces the function of the first insert abutment surface 34A. The third insert abutment surface 34C assists in achieving the desired clamping position, but like the second insert abutment surface 34B, is a preferred but optional stopper. Unlike the other insert abutment surfaces, the fourth insert abutment surface 34D has no function in the clamped position described below and only after indexing replaces the function of the third insert abutment surface 34C, to which it is identical.

In the embodiment seen in FIGS. 5A-5D, the four insert abutment surfaces comprise a pair of identical major insert abutment surfaces 34A, 34B extending along the insert elongation axis $A_E$, and a pair of minor abutment surfaces 34C, 34D which are transverse to the major abutment surfaces 34A, 34B. As the insert 12 is two-way indexable, the first and second insert abutment surfaces 34A, 34B are identical after 180° rotation about the central insert axis $A_I$. Similarly, the third and fourth insert abutment surfaces 34C, 34D are identical after 180° rotation about the central insert axis $A_I$. Thus in the following description, everything stated about either the first or second insert abutment surfaces 34A, 34B is correct for the other, and everything stated about either the third or fourth insert abutment surfaces 34C, 34D is correct for the other. This is done for conciseness, and because some of the abutment surfaces are easier shown than others in the drawings.

All of the first, second, third and fourth insert abutment surfaces 34A, 34B, 34C, 34D respectively form first, second, third and fourth internal acute angles μA, μB, μC, μD with the insert base surface 22 (noting that μB is not shown but is identical to μA after indexing and μC is not shown but is identical to μD after indexing). As will be understood from the drawings, in the present specification and claims, an "internal" angle is measured inside the material of a component as shown, as opposed to an "external" angle measured outside of the material.

In FIG. 5B, both the first and second insert abutment surfaces 34A, 34B (which project into the page) are shown to be parallel with the insert elongation axis $A_E$, although such alignment is optional.

In the view of FIG. 5B, using imaginary extension lines, it is shown the first and third insert abutment surfaces 34A, 34C can form an external insert abutment surface angle λ. The external insert abutment surface angle λ is in this example is 90°, although such angle is optional. To perform as a stopper, the third insert abutment surface 34C need only be transverse to the first or second insert abutment surface 34A, 34B, however, it will be understood, that an angle closer to a right angle provides a securer stopping function.

While discussing insert abutment surfaces as shown by hatch lines in FIG. 5A, attention is drawn to a fastener abutment surface 58. It will be understood that such surface could be of any desired shape allowing for abutment. Further when a clamping position includes the first abutment surface 34A being the abutment surface closest to the front tool end 36A the fastener abutment surface 58 abutted by the fastener 16 is the one designated as "58A" in FIG. 5D. The identical abutment surface designated as 58B in FIG. 5A is abutted when the insert 12 is subsequently indexed. Thus, the active fastener abutment surface is remote from the from the tool end 36A. Notably, in this preferred but non-limiting embodiment, the fastener abutment surfaces 58A, 58B are located at an intersection of the rear and flank insert sides, which is beneficial for providing both rotational and translational motion as described below.

Referring to FIGS. 6A to 7B, the tool holder 14 comprises opposite front and rear tool ends 36A, 36B (FIG. 3C), opposite upper and lower tool sides 36C, 36D connecting the front and rear tool ends 36A, 36B; opposite first and second flank tool sides 36E, 36F connecting the front and rear tool ends 36A, 36B and the upper and lower tool sides 36C, 36D; an elongated shank portion 38 defining a tool elongation axis $A_T$ (i.e. extending parallel with the shank portion 38); and a head portion 40 connected to the shank portion 38.

The head portion 40 comprises an insert pocket 42, which in this example has a basic elongate shape which extends basically parallel with the tool elongation axis $A_T$.

Figure 6A:
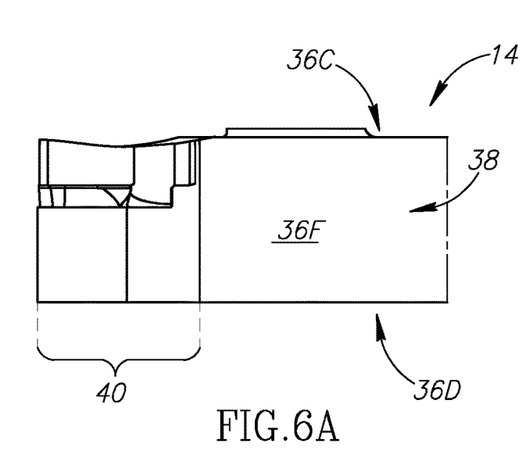
FIG. 6A is a side view of a portion of a tool holder of the tool assembly in FIG. 3A.
Figure 6B:
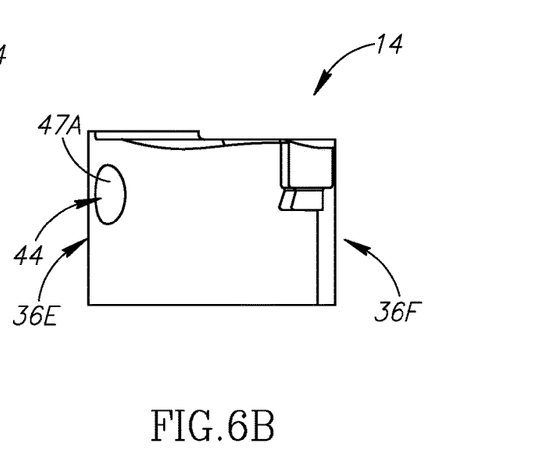
FIG. 6B is a front view of the tool holder in FIG. 6A.
Figure 7A:
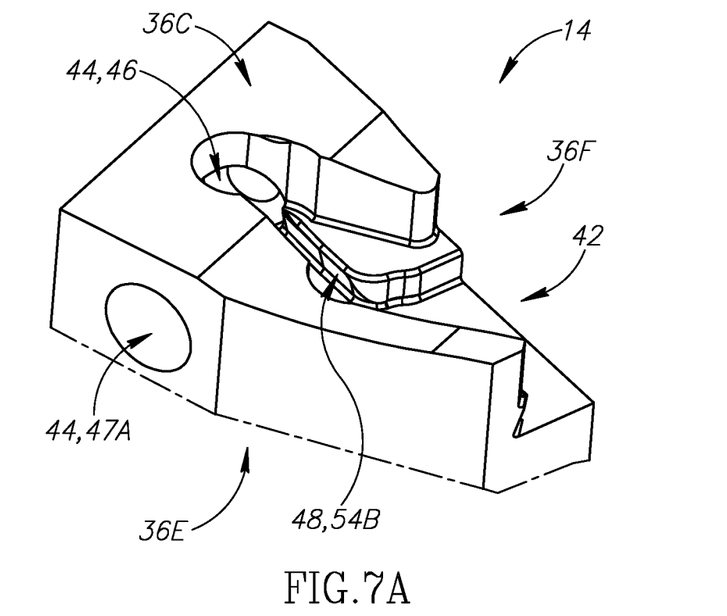
FIG. 7A is a perspective view of a portion of the tool holder in FIG. 6A, particularly the insert pocket with intended abutment surfaces exemplified with imaginary dotted portions.
Figure 7B:
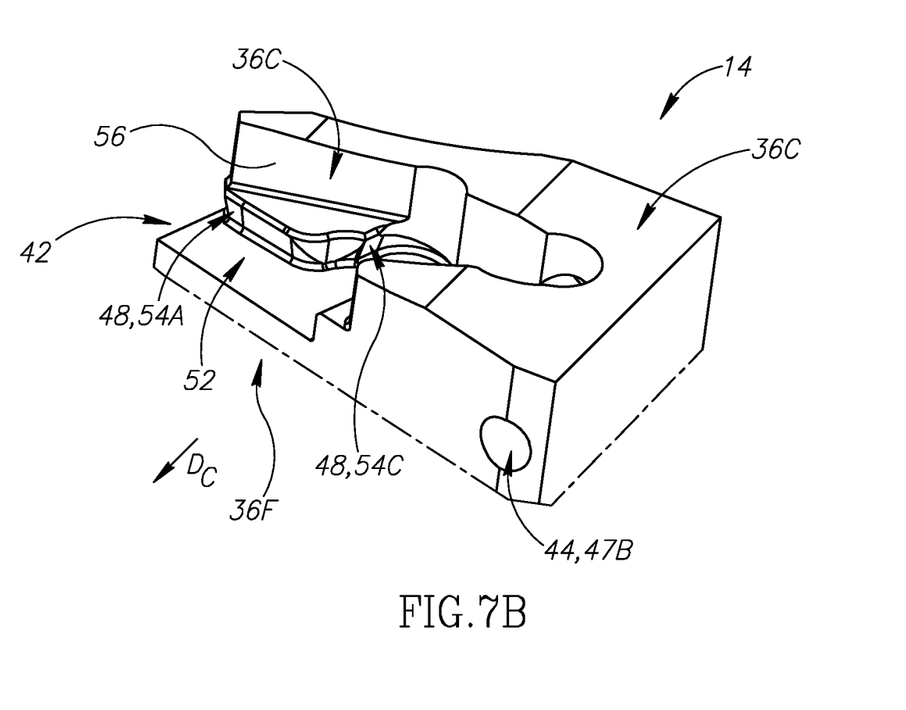
FIG. 7B is a similar perspective view of portion of the tool holder in FIG. 7A.
Figure 7C:
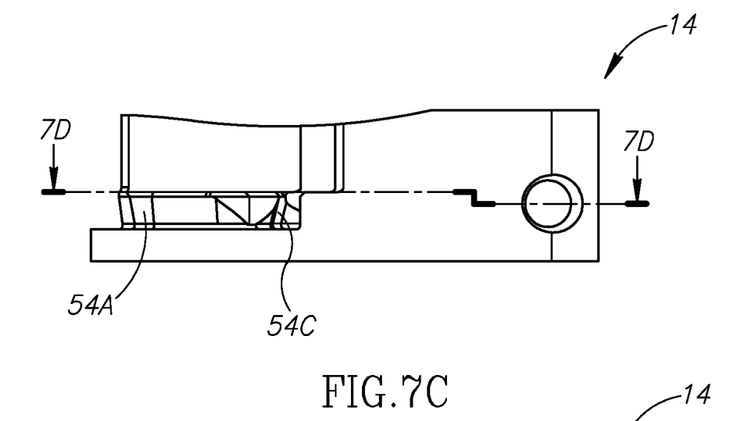
FIG. 7C is a side view of the portion of the tool portion in FIG. 7A.
Figure 7D:
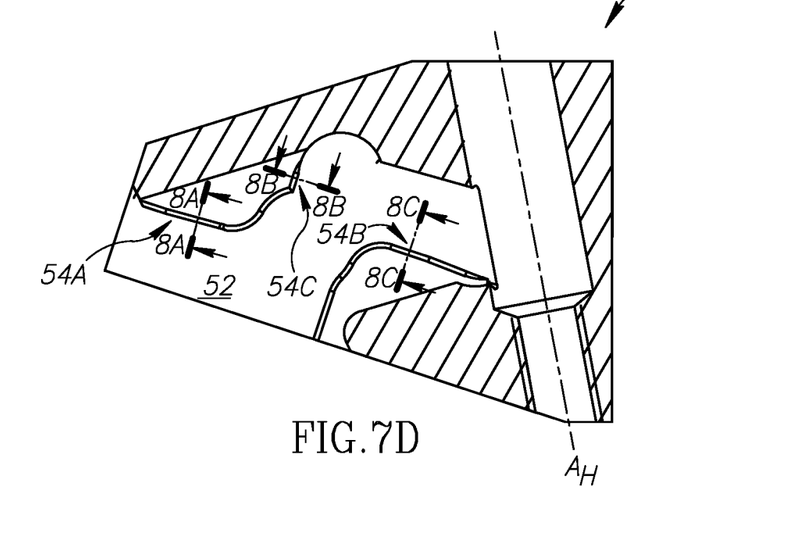
FIG. 7D is a section view along line 7D-7D in FIG. 7C.

The head portion 40 further comprises a fastener hole 44 (FIG. 6B) having a fastener hole axis $A_H$ (FIG. 7D). In the shown embodiment, the fastener hole 44 extends through both the first and second flank tool sides 36E, 36F. This is done for ease of production. In other embodiments, not shown, the fastener hole 44 may extend between only one of two the flank tool sides 36E, 36F and a pocket opening 46 in the insert pocket 42. As best seen in FIG. 7A, the fastener hole 44 intersects the insert pocket 42 at the pocket opening 46. Restated, the pocket opening 46 interrupts the fastener hole 44.

The fastener hole 44 is accessed via an aperture 47A opening out to the first tool side 36E. For ease of production, the fastener hole 44 also opens out to a second aperture 47B at the second tool side 36F. It will be understood that, if desired, a fastener could be accessed by an aperture at the second tool side 36F instead of the first tool side 36E or a double ended fastener could be provided which could be actuated from either side of the tool holder 14.

Figure 8A:
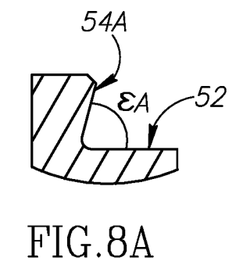
FIG. 8A is a section view along line 8A-8A in FIG. 7D.
Figure 8B:
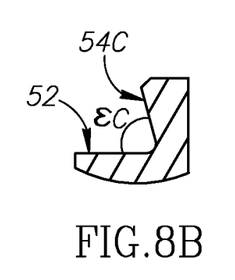
FIG. 8B is a section view along line 8B-8B in FIG. 7D.
Figure 8C:
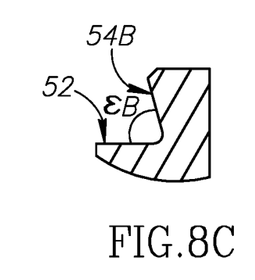
FIG. 8C is a section view along line 8C-8C in FIG. 7D.

Referring also to FIGS. 7C to 8C, the insert pocket 42 comprises a tool clamping arrangement 48 which in turn comprises a tool base surface 52; and first, second and third tool abutment surfaces 54A, 54B, 54C, each forming an external acute angle (CA, CB, CC) with the tool base surface 52 as shown in FIGS. 8A to 8C.

Figure 6C:
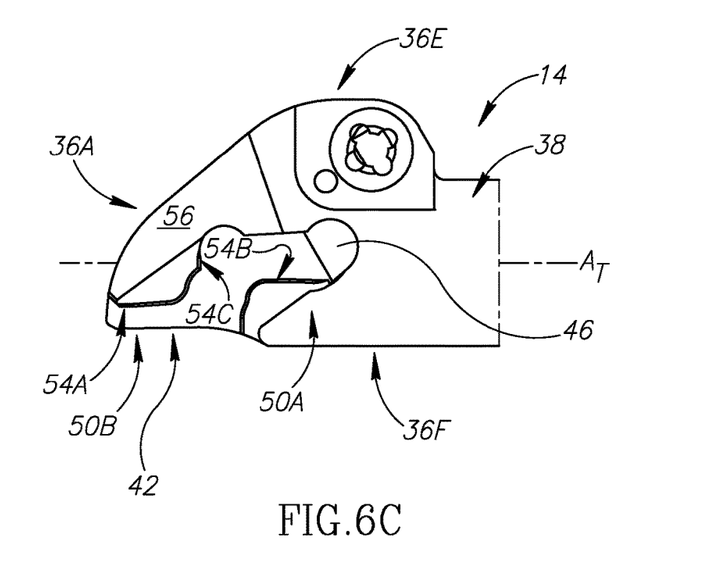
FIG. 6C is a top view of a portion of the tool holder in FIG. 6A.

As best shown in FIG. 6C, the first and second tool abutment surfaces 54A, 54B, are, in this example, parallel to the tool elongation axis $A_T$, whereas, the third tool abutment surface 54C is perpendicular to the tool elongation axis $A_T$. It will be understood that it is necessary for the third tool abutment surface 54C to be transverse to at least one of the others to restrict movement of the insert 12 parallel to the tool elongation axis $A_T$.

Still referring to FIG. 6C, the insert pocket 42 further comprises a rear pocket end 50A and a front pocket end 50B.

As most easily understood from FIGS. 7A and 7B, the insert pocket 42 opens out to the upper tool side 36C and the second flank tool side 36F and the first tool abutment surface 54A is closer to the first flank tool side 36E than the second flank tool side 36F. It will be understood that the main cutting direction $D_C$ (FIG. 3C) is basically in the direction from the second flank tool side 36F towards the first flank tool side 36E (i.e. transverse, more precisely basically a right angle, to the elongation axis $A_T$) and hence it is more beneficial for the first tool abutment surface 54 to support the insert 12 against the forces applied thereon in the opposite direction $D_D$ to the cutting direction $D_C$.

Preferably, the head portion 40 further comprises a pocket wall 56 which extends higher than the first tool abutment surface 54A. It will be understood that the additional material significantly strengthens the tool holder 14, and hence insert 12 held by it, against the forces applied thereon in the direction $D_D$.

Referring to FIGS. 5A and 7B the intended abutment surfaces are schematically shown with imaginary dotted or hatched portions. In addition to abutment of the fastener 16 (specifically the chamfered corner 16F) abutting the insert 12 (specifically the fastener abutment surface 58A) which will be described below, to achieve the clamped position there is abutment of at least the first tool abutment surface 54A with the first insert abutment surface 34A, and the tool base surface 52 with the insert base surface 22.

It will be understood that with the above-mentioned abutments, an insert can be secured in a clamped position, particularly because the first tool abutment surface 54A and first insert abutment surface 34A are configured to bias the insert 12 towards the tool base surface 52.

Preferably, in the present example there is also abutment of the second tool abutment surface 54B and the second insert abutment surface 34B.

Figure 9A:
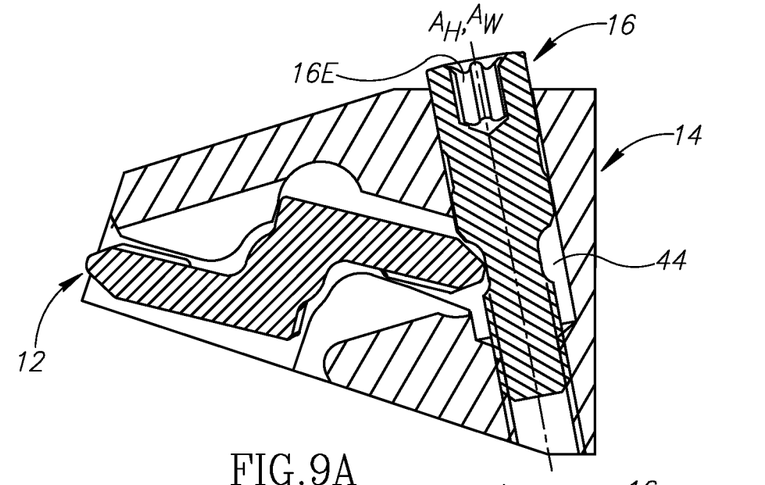
FIG. 9A is a section view of the insert pocket, screw and insert of the tool assembly FIG. 3A, in an unclamped position.
Figure 9B:
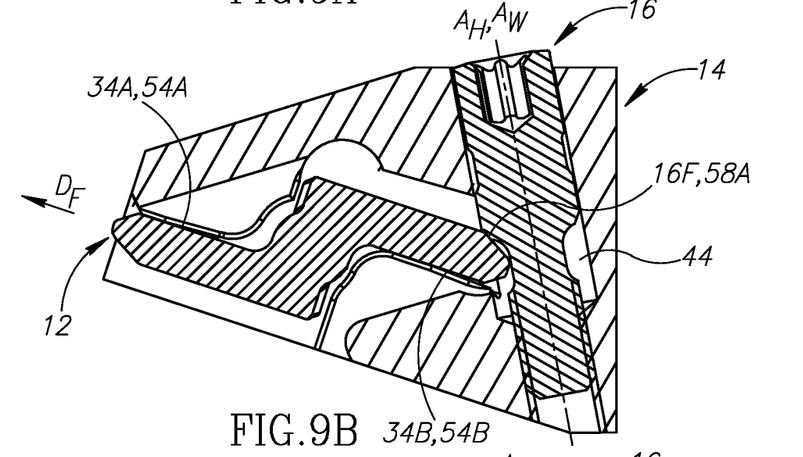
FIG. 9B is a transitional position of a view similar to FIG. 9A, with the screw having been moved further inside the insert pocket to abut the insert and partially move the insert in a clamped position.

Since the abutment surfaces are slanted relative to the tool base surface 52 and the insert base surface 22, to bring them to a clamped position it is preferred that the fastener 16 abut the insert 12 in such a manner that it partially rotates the insert into the clamped position, as shown in the transition of the positions of the insert 12 shown from FIG. 9A to 9B.

Further, preferably, there is also provided the third tool abutment surface 54C which abuts the third insert abutment surface 34C. This provides a stopper effect to halt the insert 12 from sliding forward in a forward direction $D_F$ (FIG. 3C) which is basically parallel with the tool elongation axis $A_T$. While the third tool and insert abutment surfaces 54C, 34C are similarly slanted relative to the tool and insert base surfaces 52, 22, it will be understood that said slanting is less necessary than the first and second tool and insert abutment surfaces 54A, 54B, 34A, 34B. Indeed, similar to the second tool abutment surface 54B and the second insert abutment surface 34B, the third tool and insert abutment surfaces 54C, 34C in their entirety are preferred but optional. Nonetheless it will be understood that the second tool abutment surface 54B and the second insert abutment surface 34B significantly contribute to stability and are thus highly preferred.

Figure 9C:
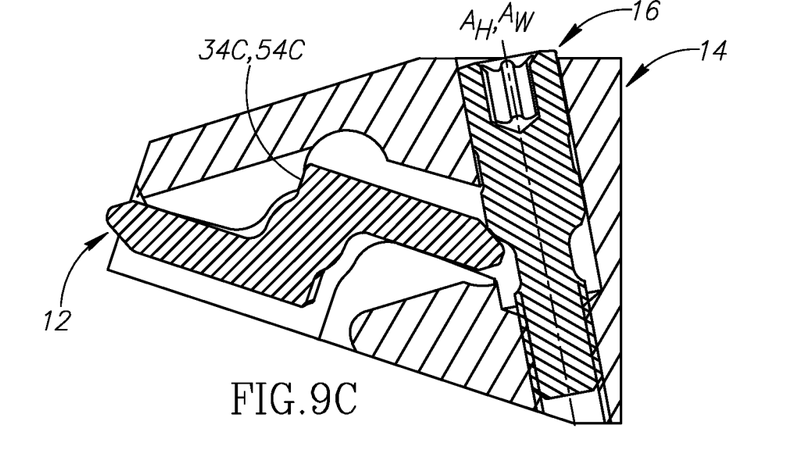
FIG. 9C is a similar view to FIGS. 9A and 9B, except that the screw has been moved further inside the insert pocket to abut the insert such that it is now secured in a clamped position in the insert pocket.

Referring also to FIGS. 9A to 9C, in operation, the fastener 16 in this example is moved by using a screwdriver (not shown) and rotating the fastener 16 via the tool receiving arrangement 16E.

More precisely, such rotation moves the fastener 16 from an initial position shown in FIG. 9A further into the fastener hole 44 to an intermediate position, as shown in FIG. 9B.

In FIG. 9B the chamfered corner 16F, abuts the fastener abutment surface 58A at the pocket opening 46 (shown in FIG. 7A). Such abutment moves the insert 12 towards the clamped position. Specifically, in FIG. 9B, such movement includes rotation of the insert 12 so that the first and second tool and insert abutment surfaces 54A, 54B, 34A, 34B are brought into contact.

The chamfered corner 16F and fastener abutment surface 58A are both configured (chamfered) such that their abutment both rotates the insert 12 and also moves it in the forward direction $D_F$.

With continued rotation of the fastener 16, the insert 12 is moved further in the forward direction $D_F$ until the clamped position, shown in FIG. 9C, is reached. In such a clamped position, the third tool abutment surface 54C abuts the third insert abutment surface 34C which effectively halts movement of the insert 12.

As seen in FIG. 9A-9C, in the initial, intermediate and clamped positions of the assembled tool, the fastener 16 occupies the fastener hole 44 and extends along the fastener hole axis $A_H$. In some embodiments, the fastener hole axis $A_H$ is coincident with the fastener axis $A_W$. Also in some embodiments, in an assembled tool in which the fastener hole 44 opens to both of the first and second flank tool sides 36E, 36F, the fastener axis $A_W$ neither intersects, nor passes through, the insert 12, even though the fastener 16 directly contacts the insert 12.

Reverting to FIGS. 4A to 4C, to reduce stresses on the fastener 16 the screw head portion 16A is configured to have an unusually long head axial length $L_H$ to increase the defined abutment area from the tool receiving end 16C to the insert abutment end 16D. To further ensure the defined abutment (contact areas) over a relatively long area, the fastener 16 is provided with said annular recessed portion 16H.

Notably, clamping the insert 12 (as described above) or unclamping it by rotating the fastener 16 in the opposite direction is achieved by actuating only a single element, namely the fastener 16, and such actuation is via one of the flank tool sides (in this example accessing the fastener hole 44 via the first flank tool side 36E). Hence, the tool holder 14 does not need to be detached from a gang (not shown) in order to access a fastener hole opening out to, for example, the upper tool side 36C.

The invention claimed is:

1. A swiss turning tool assembly comprising:
an insert devoid of a clamping through hole; and
a tool holder;

the insert comprising:
    opposite rake and insert base surfaces and an insert flank surface connecting the rake and insert base surfaces;
    a cutting edge formed along at least a portion of an intersection of the insert flank surface and the rake surface; and
    an insert clamping arrangement in turn comprising a first insert abutment surface forming an internal acute angle with the insert base surface;
the tool holder comprising:
    opposite front and rear tool ends;
    opposite upper and lower tool sides connecting the front and rear tool ends;
    opposite first and second flank tool sides connecting the front and rear tool ends and the upper and lower tool sides;
    an elongated shank portion defining a tool elongation axis; and
    a head portion connected to the shank portion;
the head portion comprising:
    an insert pocket;
    a fastener hole having a fastener hole axis and extending through at least one of the first and second flank tool sides, the fastener hole opening out to a pocket opening in the insert pocket; and
    a single fastener configured to bring the insert into a clamped position on the insert pocket;
the insert pocket comprising a tool clamping arrangement which in turn comprises:
    a tool base surface; and
    a first tool abutment surface forming an external acute angle with the tool base surface;
wherein:
    the fastener is configured to occupy the fastener hole and protrude into the insert pocket via said pocket opening and abut the insert to bring the tool and insert clamping arrangements into a clamped position;
and wherein, in the clamped position:
    the fastener abuts the insert;
    the first tool abutment surface abuts the first insert abutment surface; and
    the tool base surface abuts the insert base surface.

2. The tool assembly according to claim 1, wherein the fastener is configured such that, upon abutting the insert, the insert is at least partially rotated into the clamped position.

3. The tool assembly according to claim 1, wherein the insert pocket comprises opposite front and rear pocket ends, the front pocket end being closer to the front tool end than the rear pocket end; and said pocket opening is located at the rear pocket end.

4. The tool assembly according to claim 3, wherein: the insert further comprises: opposite front and rear insert sides, the rear insert side being closer to the rear pocket end than the front insert side; and opposite first and second flank insert sides; and wherein said fastener abuts the insert at an intersection region of the rear insert side and the first flank insert side.

5. The tool assembly according to claim 1, wherein: the insert pocket opens out to the upper tool side and the first flank tool side; the first tool abutment surface is closer to the first flank tool side than the second flank tool side; and the head portion comprises a pocket wall adjacent the first flank side which extends higher than the first tool abutment surface.

6. The tool assembly according to claim 1, wherein: the tool clamping arrangement further comprises: a second tool abutment surface further from the front tool end than the first tool abutment surface, and the first and second tool abutment surfaces are each closer to a different one of the first and second flank tool sides; and the insert clamping arrangement further comprises: a second insert abutment surface spaced apart from the first insert abutment surface, and the first and second tool abutment surfaces respectively abut the first and second insert abutment surfaces, in the clamped position.

7. The tool assembly according to claim 6, wherein: the insert pocket opens out to the upper tool side and the second flank tool side; the first tool abutment surface is closer to the first flank tool side than the second flank tool side; the second tool abutment surface is closer to the second flank tool side than the first flank tool side; and the head portion comprises a pocket wall adjacent the first flank side which extends higher than the first tool abutment surface.

8. The tool assembly according to claim 6, wherein the second tool abutment surface forms an external acute angle with the tool base surface.

9. The tool assembly according to claim 6, wherein the tool clamping arrangement further comprises a third tool abutment surface located between the first and second tool abutment surfaces.

10. The tool assembly according to claim 9, wherein the third tool abutment surface forms an external acute angle with the tool base surface.

11. The tool assembly according to claim 1, wherein, in a top view of the tool base surface, the first tool abutment surface is substantially parallel with the tool elongation axis within 15°.

12. The tool assembly according to claim 1, wherein the insert pocket has a basic elongate shape which is basically parallel with the tool elongation axis.

13. The tool assembly according to claim 1, wherein the insert is a two-way indexable insert and is 180° rotationally symmetric.

14. The tool assembly according to claim 1, wherein a frontmost portion of the cutting edge of the insert is a wiper, the wiper being angled at a right-angle from an adjacent portion of the cutting edge.

15. The tool assembly according to claim 1, wherein the insert is a diamond shaped insert having a 55° or smaller nose angle.

16. The tool assembly according to claim 15, wherein the insert is a diamond shaped insert having a 35° nose angle.

17. The tool assembly according to claim 1, wherein the fastener comprises a screw head portion and a threaded shank portion connected thereto; the screw head portion comprising: a tool receiving end formed with a tool receiving arrangement; an insert abutment end comprising a chamfered corner; a head axial length LH defined from the tool receiving end to the insert abutment end; and a shank axial length LS defined along a threaded portion of the threaded shank portion; wherein: the head axial length LH is equal to or greater than half of the shank axial length LS.

18. The tool assembly according to claim 17, wherein the fastener's threaded shank portion further comprises, adjacent to the screw head portion, a relief portion having a diameter smaller than the threaded part of the threaded shank portion.

19. The tool assembly according to claim 17, wherein the fastener's screw head portion is formed with an annular recessed portion located between the tool receiving end and the insert abutment end.

20. The tool assembly according to claim 1, wherein the fastener hole opens out to a pocket opening formed in the upper tool side.

* * * * *